US007004076B2

(12) United States Patent
Traubenkraut et al.

(10) Patent No.: US 7,004,076 B2
(45) Date of Patent: Feb. 28, 2006

(54) MATERIAL HANDLING SYSTEM ENCLOSED TRACK ARRANGEMENT

(75) Inventors: Glen D. Traubenkraut, Frankenmuth, MI (US); Jerry L. Maxson, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/635,127

(22) Filed: Aug. 6, 2003

(65) Prior Publication Data

US 2005/0028704 A1 Feb. 10, 2005

(51) Int. Cl.
*E01B 25/00* (2006.01)

(52) U.S. Cl. .......................................... 104/111; 104/89

(58) Field of Classification Search ................ 104/111, 104/89, 93, 94, 95; 248/340, 215, 227.1, 248/228.1, 228.2, 228.3, 228.4, 228.5, 228.6, 248/228.7, 228.8

See application file for complete search history.

(56) References Cited

U.S. PATENT DOCUMENTS

| | | | | |
|---|---|---|---|---|
| 827,829 | A * | 8/1906 | Thomas | 105/154 |
| 2,821,146 | A * | 1/1958 | Mahrle et al. | 104/95 |
| 3,140,848 | A * | 7/1964 | Sherburne | 248/72 |
| 5,074,423 | A | 12/1991 | Smith | 212/135 |
| 5,598,785 | A * | 2/1997 | Zaguroli, Jr. | 104/111 |
| 5,694,857 | A | 12/1997 | Taylor | 104/137 |
| 5,947,424 | A | 9/1999 | Heath | 248/58 |
| 6,012,691 | A | 1/2000 | van Leeuwen et al. | 248/228.3 |

* cited by examiner

*Primary Examiner*—Mark T. Le
(74) *Attorney, Agent, or Firm*—Christopher DeVries

(57) ABSTRACT

A hanger connects an enclosed track rail to a beam such that the enclosed track rail is positioned laterally with respect to the beam. The hanger and the arrangement of the track rail with respect to the beam allows rapid conversion of a material handling system from "open roller" tracks to enclosed tracks without removal of existing tracks, without adding new structural support for the enclosed tracks, and without substantial reduction in overhead clearance. A method of retrofitting an enclosed track rail to a material handling system having an open-roller track is also provide.

3 Claims, 2 Drawing Sheets

MATERIAL HANDLING SYSTEM ENCLOSED TRACK ARRANGEMENT

TECHNICAL FIELD

This invention relates to material handling system arrangements wherein an enclosed track rail is mounted laterally with respect to a beam.

BACKGROUND OF THE INVENTION

Prior art material handling systems include an overhead beam, such as an I-beam or a similar beam. A lower flange of the beam functions as a track on which the rollers of a trolley are engaged so that the trolley is translatable along the beam. The trolley is operatively connected to a load-carrying apparatus, such as a hoist or a block and tackle apparatus, to facilitate the transportation of heavy or cumbersome objects.

These prior art systems are sometimes described as "open-track" or "open-roller" because the flange of the beam, i.e., the track on which the trolley wheels are engaged, is exposed to the environment. The accumulation of dust and debris on the track may cause considerable resistance to the trolley rollers during trolley translation along the track. The resistance may be particularly problematic if the trolley is propelled manually. To alleviate this problem, newer material handling systems often employ enclosed track rails, in which a track and passage for a trolley are enclosed and therefore protected from the environment. The new enclosed track rails result in less resistance to the movement of the trolley, and have fewer maintenance requirements, than the prior art open-roller tracks. It is therefore desirable to replace open-roller tracks with enclosed track rails.

To avoid the cost of removing existing open-track beams and installing new support structure for new enclosed track rail, enclosed track rail is sometimes retrofitted to existing material handling systems by suspending the new track rail below an existing open-track beam with a hanger connected to the lower flange of the beam. However, retrofitting a material handling system by suspending an enclosed track rail from an existing beam substantially increases the vertical dimension of the material handling system, which correspondingly decreases overhead clearance beneath the material handling system. This problem is particularly acute where an existing beam is in a low-clearance area; in this instance, suspension of an enclosed track rail below the beam may be impractical or impossible because the enclosed track rail would be excessively low. Substantial cost must then be incurred in removing the existing beams and installing new support structure for the enclosed track rail.

SUMMARY OF THE INVENTION

A hanger for mounting an enclosed track rail to a beam is provided. The hanger includes at least one structural member to which the enclosed track rail is operatively connectable, and a fastening element adapted to connect the structural member to the beam. The hanger is configured so that at least a portion of the structural member projects sufficiently outwardly from the beam to enable at least a portion of the enclosed track rail to be laterally positioned with respect to the beam.

A material handling system arrangement is also provided. The material handling system comprises a rail at least partially defining a passage, a track within the passage, a beam, and a hanger operatively connecting the rail to the beam such that at least a portion of the rail is positioned laterally with respect to the beam. A corresponding method is also provided. The method includes connecting an enclosed track rail to a horizontally-oriented beam such that at least a portion of the rail is positioned laterally with respect to the beam.

The invention enables rapid conversion of "open roller" track systems to enclosed track systems with little or no loss of overhead space and without the expense and time involved in removing existing beams and installing new support structure.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
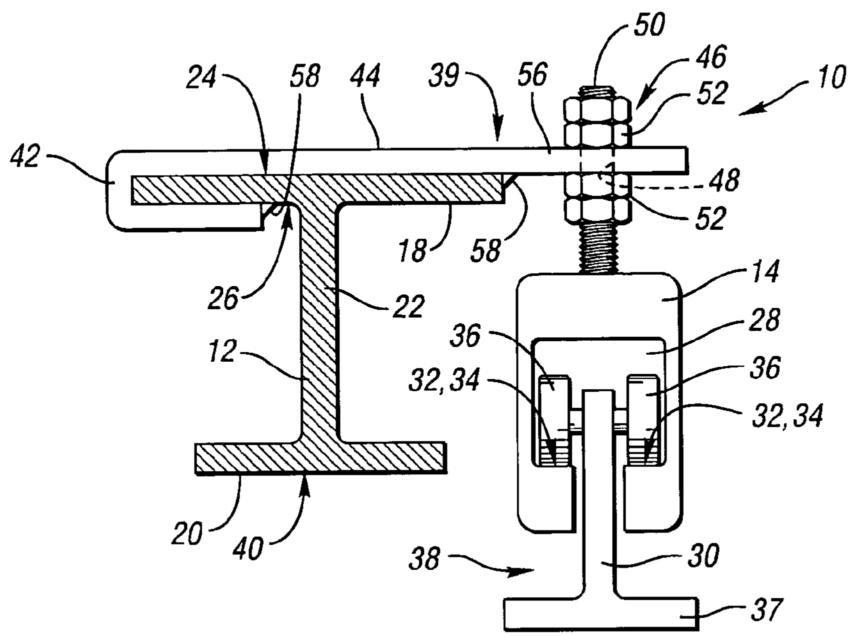
FIG. 1 is a schematic sectional side view of a material handling system arrangement including a beam, an enclosed track rail, and a hanger.

Referring to FIG. 1, a material handling system 10 is schematically depicted. The material handling system 10 includes a horizontally oriented open-track I-beam 12 and is retrofitted to include an enclosed track rail 14 parallel to the I-beam. The I-beam 12 includes an upper flange 18, a lower flange 20, and a web 22 interconnecting the upper flange and the lower flange. The upper flange 18 and the lower flange 20 are substantially horizontally oriented, and the web 22 is substantially vertically oriented. The upper flange 18 is characterized by an upper surface 24 and a lower surface 26. The lower surface 26 is substantially bisected by the web 22. In the context of the present invention, an "I-beam" includes beams having an upper flange and a lower flange interconnected by a web; the upper flange may or may not have a different size or shape than the lower flange.

The enclosed track rail 14 forms a partially-enclosed passage 28 in which a trolley 30 is partially located. The rail 14 defines two surfaces 32 forming a track 34 on which rollers 36 of the trolley 30 are rollingly engaged for translation of the trolley 30 along the rail 14. The rail 14 may, for example, be part of a monorail system, a runway for a bridge crane system, etc. In the situation where the rail 14 is a runway for a bridge crane system, the trolley 30 will be attached to a support 37 for a bridge rail (not shown) to form an end truck 38. The rail 14 is mounted to the I-beam 12 via a hanger 39.

The hanger 39 supports the rail 14 from the I-beam 12 such that at least a portion of the rail 14 is positioned laterally with respect to the I-beam 12. In other words, the rail 14 is positioned such that at least a portion of the rail 14 extends alongside the I-beam 12. More specifically, at least a portion of the rail 14, including at least a portion of the passage 28, is positioned higher than the lower surface 40 of the I-beam 12.

The hanger 39 includes a first fastening element 42 that connects the hanger 39 to the upper flange 18 by contacting the lower surface 26 of the upper flange 18 on a side of the web 22 different from the side of the web 22 on which the rail 14 is located. The fastening element 42 in the embodiment depicted is an integral curved extension of a structural member 44 that forms a hook. However, those skilled in the art will recognize a variety of fastening elements that may be employed to connect the hanger to the beam within the scope of the claimed invention.

The hanger 39 includes a second fastening element 46 that connects the rail 14 to the hanger 39. In the embodiment depicted, the second fastening element 46 includes a hole 48 through which a threaded rod 50 extends. The threaded rod 50 is held in place by a plurality of nuts 52. The height at which the rail 14 is suspended is adjustable by adjusting the position of the rod 50 with respect to the structural member 44. The rod may be mounted at one of its ends to the rail 14 by welding, a clinch nut, etc.

The structural member 44 has a cantilever portion 56 between the first fastening element 42 and the second fastening element 46. The cantilever portion 56 projects outwardly from, i.e., away from, the I-beam 12 and transmits loads between the rail 14 and the I-beam 12. Welds 58 may be employed to further affix the hanger 39 to the I-beam 12.

Figure 2:
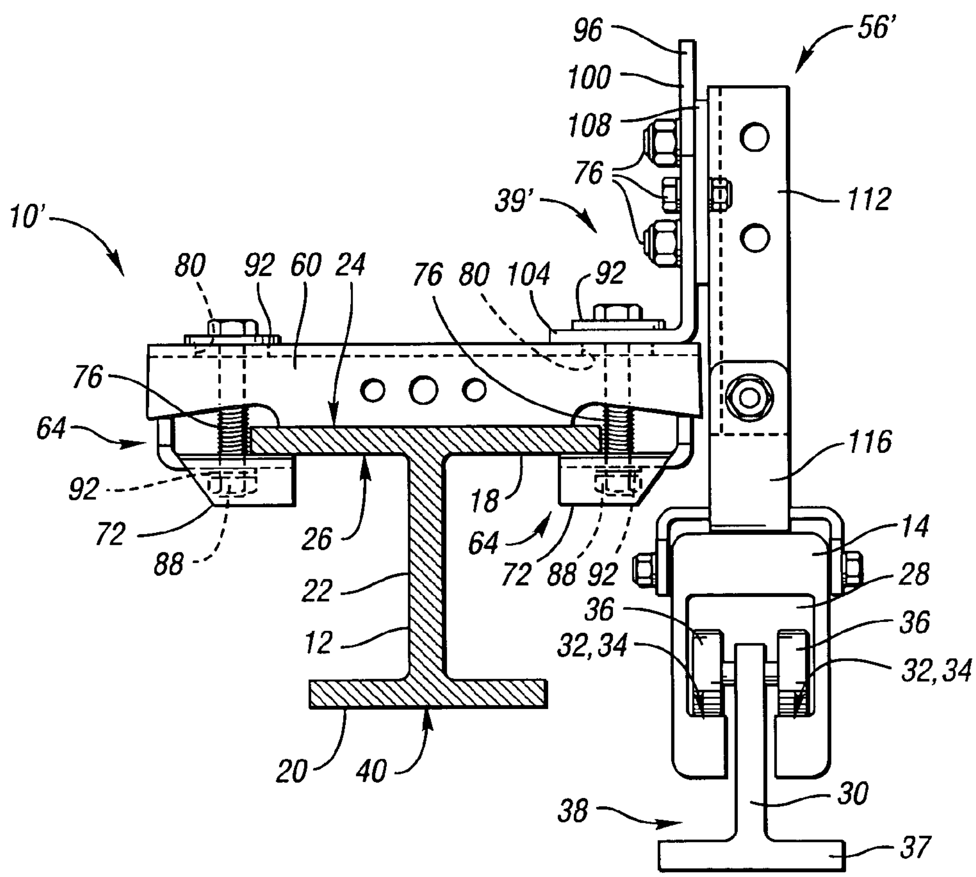
FIG. 2 is a schematic sectional side view of the material handling system arrangement of FIG. 1 employing an alternative hanger configuration.
Figure 3:
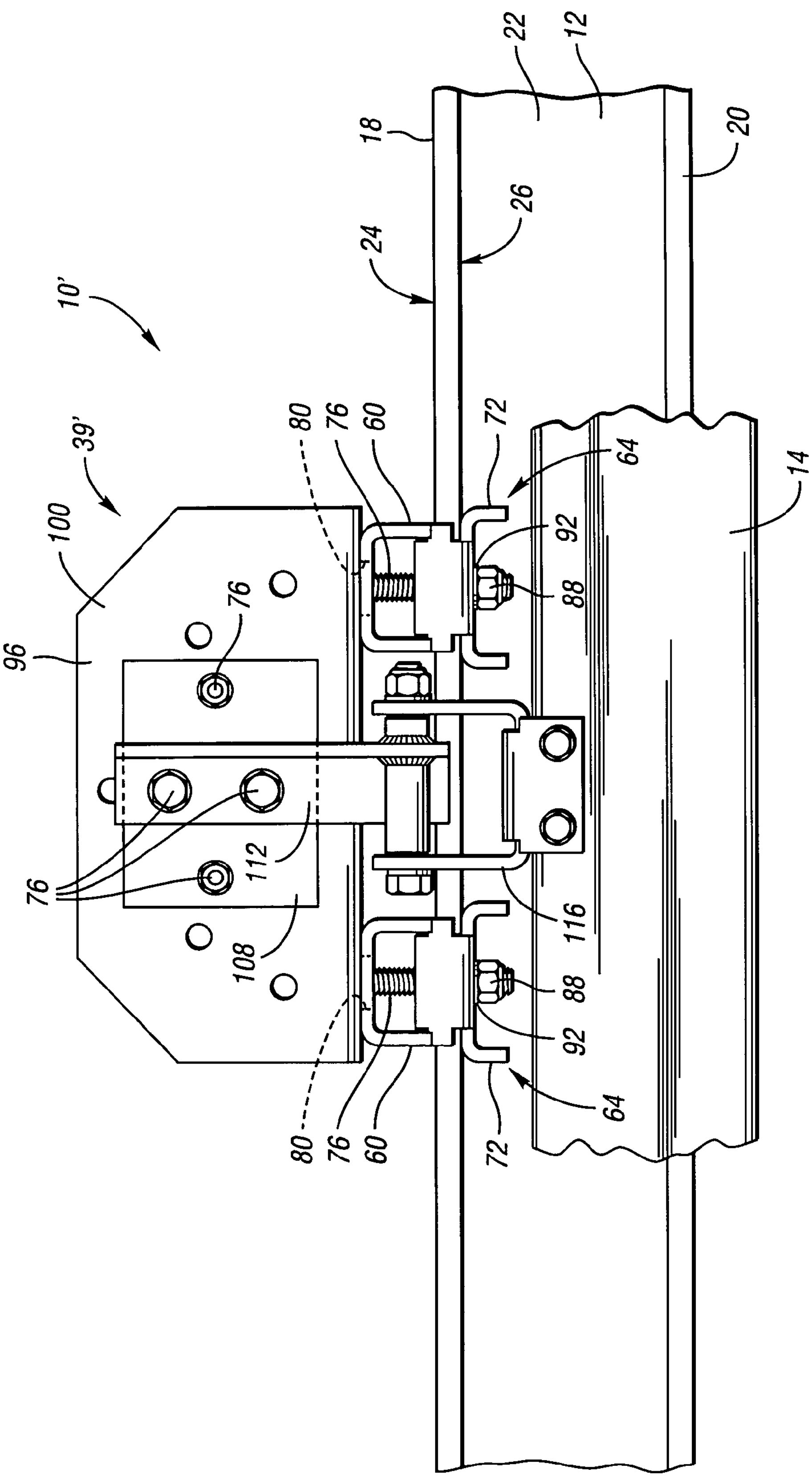
FIG. 3 is a schematic front view of the material handling system of FIG. 2.

Referring to FIGS. 2 and 3, wherein like reference numbers refer to like components from FIG. 1, a material handling system 10' employing an alternative hanger 39' is schematically depicted. The hanger 39' includes two U-shaped members 60 spaced a distance apart from one another and extending transversely across the upper surface 24 of the upper flange 18. Each of the two members 60 has two clamps 64 that connect the member 60 to the upper flange 18.

Each clamp 64 includes a lower member 72 that contacts the lower surface 26 of the upper flange 18, a bolt 76 that extends through an elongated slot 80 on one of the members 60 and a hole (not shown) in the lower member 72, and a nut 88 that engages the bolt 76 so that the bolt provides a compressive force to member 60 and the lower member 72. For each member 60, one clamp 64 is located on the same side of the web 22 as the rail 14 and one clamp 64 is on the opposite side of the web 22. Washers 92 are preferably used between the bolt head and the member 60, and between the nut 88 and the lower member 72. The bolts 76 are movable within the slots 80 so that the clamps 64 are adjustable to fit I-beams of various sizes. Those skilled in the art may find it preferable to employ elongated slots, rather than circular bolt holes, on other hanger components in order to provide flexibility in the relative placement of hanger components with respect to one another. Alternatively, multiple circular bolt holes through which a bolt may extend, rather than a single bolt hole, may be employed to provide flexibility in the relative placement of hanger components with respect to one another.

An L-shaped bracket 96 has an upright portion 100 and a horizontal portion 104. The horizontal portion 104 includes elongated slots (not shown) through which the bolts 76 of two clamps 64 extend so that the L-shaped bracket 96 is secured to the members 60. A plate 108 and a vertically-oriented support member 112 are attached to the upright portion 100 by bolts 76 such that the plate 108 is between the upright portion 100 and the vertical support member 112.

At least a portion of some of the structural members, including members 60, the L-shaped bracket 96, the plate 108, and the vertical support member 112, form a cantilever portion 56' of the hanger 39'. A rail attachment 116 fastens the rail 14 to the cantilever portion 56' at the vertically oriented support member 112. The cantilever portion 56' extends sufficiently outwardly from the I-beam 12 to enable at least a portion of the rail 14 to be positioned laterally with respect to the I-beam.

While the best modes for carrying out the invention have been described in detail, those familiar with the art to which this invention relates will recognize various alternative designs and embodiments for practicing the invention within the scope of the appended claims.

What is claimed is:

1. A method of retrofitting a material handling system having a horizontally-oriented beam defining an exposed track, the method comprising:

connecting a rail to the horizontally-oriented beam such that at least a portion of the rail is positioned at the same vertical height as at least a portion of the beam, the rail at least partially defining a passage and a partially enclosed track;

wherein the beam includes an upper flange and a lower flange oriented horizontally, and a vertically oriented web interconnecting the upper flange and the lower flange; and wherein the method further comprises employing a cantilever to support the rail from the beam.

2. The method of claim 1, further comprising installing a trolley having at least one wheel such that at least a portion of the trolley is located within the passage and said at least one wheel is engaged with the enclosed track such that the trolley is translatable within the passage.

3. A method of retrofitting a material handling system having an I-beam characterized by a horizontally-oriented upper flange and a horizontally-oriented lower flange, the method comprising:

causing a trolley having two roller elements to translate with respect to the I-beam whereby the two roller elements roll on the lower flange;

subsequent to said causing a trolley having two roller elements to translate with respect to the I-beam, connecting a hanger to the upper flange of the I-beam; and subsequent to said causing a trolley having two roller elements to translate with respect to the I-beam, operatively connecting a rail to the hanger such that at least a portion of the rail is at the same vertical height as at least a portion of the I-beam, the rail at least partially defining a passage and a track at least partially enclosed within the passage.

* * * * *